United States Patent
Kawamata

(10) Patent No.: US 11,107,267 B2
(45) Date of Patent: Aug. 31, 2021

(54) IMAGE GENERATION APPARATUS, IMAGE GENERATION METHOD, AND PROGRAM

(71) Applicant: SONY INTERACTIVE ENTERTAINMENT INC., Tokyo (JP)

(72) Inventor: Wataru Kawamata, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/494,076

(22) PCT Filed: Mar. 30, 2017

(86) PCT No.: PCT/JP2017/013327
§ 371 (c)(1),
(2) Date: Sep. 13, 2019

(87) PCT Pub. No.: WO2018/179254
PCT Pub. Date: Oct. 4, 2018

(65) Prior Publication Data
US 2020/0118327 A1 Apr. 16, 2020

(51) Int. Cl.
*G06T 15/20* (2011.01)
*G06T 17/20* (2006.01)
*G06T 5/50* (2006.01)

(52) U.S. Cl.
CPC .............. *G06T 15/20* (2013.01); *G06T 17/20* (2013.01)

(58) Field of Classification Search
CPC ............ G06T 15/20; G06T 17/20; G06T 5/50
See application file for complete search history.

(56) References Cited

U.S. PATENT DOCUMENTS

2002/0061194 A1* 5/2002 Wu .................. G03B 35/00 396/324
2013/0076619 A1* 3/2013 Carr ................. G06F 3/002 345/156

(Continued)

FOREIGN PATENT DOCUMENTS

JP 2000-348213 A 12/2000
JP 2002-24850 A 1/2002

OTHER PUBLICATIONS

International Search Report and Written Opinion dated Jun. 20, 2017, from International Application No. PCT/JP2017/013327, 6 sheets.

(Continued)

*Primary Examiner* — Yi Yang
(74) *Attorney, Agent, or Firm* — Katten Muchin Rosenman LLP

(57) ABSTRACT

Provided are an image generation apparatus, an image generation method, and a program that can reflect, on a virtual space image, a natural light environment of a real space in actually capturing captured images. A corresponding camera position specification unit (68) specifies a corresponding camera position that is a position in a virtual space equivalent to a captured position that is a position in a real space of a real camera that has captured a captured image. An influence degree determination unit (80) determines a degree of influence on a virtual space image influenced by the captured image captured by the real camera at the captured position equivalent to the corresponding camera position based on a position of a virtual camera in the virtual space and the corresponding camera position. A virtual space image generation unit (86) generates the virtual space image based on the captured image captured by the real camera at the captured position and the (Continued)

degree of influence on the virtual space image influenced by the captured image.

3 Claims, 11 Drawing Sheets

(56) References Cited

U.S. PATENT DOCUMENTS

| | | | | |
|---|---|---|---|---|
| 2014/0037213 A1* | 2/2014 | Niederberger | .......... | G06T 11/00 |
| | | | | 382/195 |
| 2015/0363665 A1* | 12/2015 | Szasz | ....................... | G06K 9/52 |
| | | | | 382/203 |
| 2016/0328833 A1* | 11/2016 | Kiyota | ............... | H04N 5/23293 |

OTHER PUBLICATIONS

International Preliminary Report on Patentability dated Oct. 1, 2019, from International Application No. PCT/JP2017/013327, 12 sheets.

Decision to Grant dated Jun. 2, 2020, from Japanese Patent Application No. 2019-508037, 3 sheets.

* cited by examiner

| POINT ID | COORDINATE DATA | NORMAL DIRECTION DATA |
|---|---|---|
| 1 | (x,y,z) | (vx,vy,vz) |

| POLYGON ID | VERTEX DATA |
|---|---|
| 1 | 1,2,3 |

IMAGE GENERATION APPARATUS, IMAGE GENERATION METHOD, AND PROGRAM

TECHNICAL FIELD

The present invention relates to an image generation apparatus, an image generation method, and a program.

BACKGROUND ART

There is a technique of generating a polygon model based on captured images obtained by imaging a subject arranged in a real space.

There is also a technique of generating and displaying a virtual space image representing a situation of the polygon model as viewed from a virtual camera in a virtual space provided with the polygon model generated in this way.

SUMMARY

Technical Problem

In generating the polygon model based on the captured images, the influence of a light environment of the real space on the subject is generally reduced to generate a polygon model independent of the light environment of the real space. Specifically, for example, white light is applied to the subject, or a diffusion plate is arranged in capturing the captured images.

Furthermore, the light environment in the virtual space image representing the situation of viewing the polygon model generated in this way is expressed by using, for example, a technique of computer graphics, such as light of a light source arranged in the virtual space. Therefore, the natural light environment of the real space in actually capturing the captured images cannot be reflected on the virtual space image in the related techniques.

The present invention has been made in view of the problem, and an object of the present invention is to provide an image generation apparatus, an image generation method, and a program that can reflect, on a virtual space image, a natural light environment of a real space in actually capturing captured images.

Solution to Problem

To solve the problem, the present invention provides an image generation apparatus that generates a virtual space image representing a situation of a virtual space as viewed from a virtual camera in the virtual space provided with a polygon model based on a captured image of a subject arranged in a real space. The image generation apparatus includes a corresponding camera position specification unit that specifies a corresponding camera position that is a position in the virtual space equivalent to a captured position that is a position in the real space of a real camera that has captured the captured image, an influence degree determination unit that, determines a degree of influence on the virtual space image influenced by the captured image captured by the real camera at the captured position equivalent to the corresponding camera position based on a position of the virtual camera and the corresponding camera position, and a virtual space image generation unit that generates the virtual space image based on the captured image and the degree of influence on the virtual space image influenced by the captured image.

In the aspect of the present invention, the influence degree determination unit determines the degree of influence at a drawing point that is a vertex or a point on a polygon included in the polygon model based on a direction from the drawing point to the corresponding camera position and a direction from the drawing point to the position of the virtual camera. The image generation apparatus further includes a pixel value determination unit that determines a pixel value of a pixel in the virtual space image associated with the drawing point based on a pixel value of a pixel associated with the drawing point in the captured image and the degree of influence at the drawing point. The virtual space generation unit generates the virtual space image based on pixel values determined for a plurality of pixels in the virtual space image.

In the aspect, the corresponding camera position specification unit may specify the corresponding camera position of the captured image for each of a plurality of captured images, the influence degree determination unit may determine the degree of influence at the drawing point associated with the captured image for each of the plurality of captured images based on the direction from the drawing point to the corresponding camera position of the captured image and the direction from the drawing point to the position of the virtual camera, and the pixel value determination unit may calculate a weighted average value of pixel values of pixels associated with the drawing point in the plurality of captured images based on degrees of influence associated with the captured images and determine the weighted average value as the pixel value of the pixel in the virtual space image associated with the drawing point.

Alternatively, the influence degree determination unit may determine the degree of influence at the drawing point based on the direction from the drawing point to the corresponding camera position, the direction from the drawing point to the position of the virtual camera, and a normal direction associated with the drawing point.

In addition, the present invention provides an image generation method of generating a virtual space image representing a situation of a virtual space as viewed from a virtual camera in the virtual space provided with a polygon model based on a captured image of a subject arranged in a real space. The image generation method includes a corresponding camera position specification step of specifying a corresponding camera position that is a position in the virtual space equivalent to a captured position that is a position in the real space of a real camera that has captured the captured image, an influence degree determination step of determining a degree of influence on the virtual space image influenced by the captured image captured by the real camera at the captured position equivalent to the corresponding camera position based on a position of the virtual camera and the corresponding camera position, and a virtual space image generation step of generating the virtual space image based on the captured image and the degree of influence on the virtual space image influenced by the captured image.

In addition, the present invention provides a program for generating a virtual space image representing a situation of a virtual space as viewed from a virtual camera in the virtual space provided with a polygon model based on a captured image of a subject arranged in a real space. The program causing a computer to execute a corresponding camera position specification procedure of specifying a corresponding camera position that is a position in the virtual space equivalent to a captured position that is a position in the real space of a real camera that has captured the captured image, an influence degree determination procedure of determining a degree of influence on the virtual space image influenced by the captured image captured by the real camera at the captured position equivalent to the corresponding camera position based on a position of the virtual camera and the corresponding camera position, and a virtual space image generation procedure of generating the virtual space image based on the captured image and the degree of influence on the virtual space image influenced by the captured image.

DESCRIPTION OF EMBODIMENT

Hereinafter, an embodiment of the present invention will be described in detail with reference to the drawings.

Figure 1:
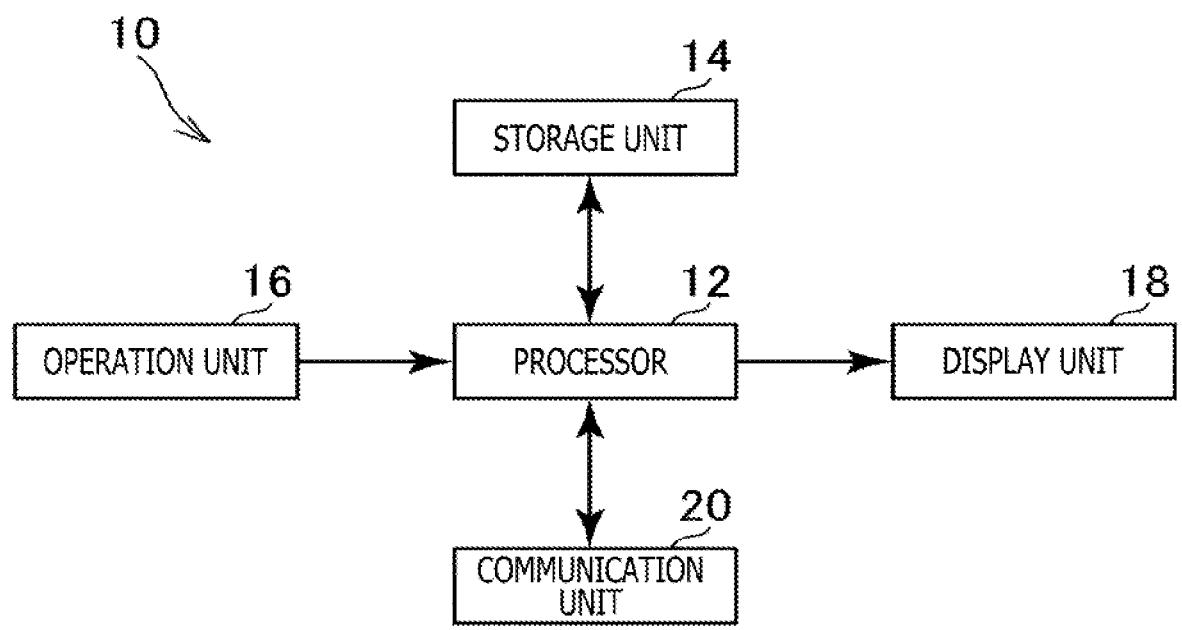
FIG. 1 is a configuration diagram of an image generation apparatus according to an embodiment of the present invention.

FIG. 1 is a configuration diagram of an image generation apparatus 10 according to an embodiment of the present invention. The image generation apparatus 10 according to the present embodiment is, for example, a computer, such as a game console and a personal computer. As illustrated in FIG. 1, the image generation apparatus 10 according to the present embodiment, includes, for example, a processor 12, a storage unit 14, an operation unit 16, a display unit 18, and a communication unit 20.

The processor 12 is, for example, a program control device, such as a central processing unit (CPU), that operates according to a program installed on the image generation apparatus 10. The processor 12 according to the present embodiment also includes a graphics processing unit (GPU) that draws an image in a frame buffer based on a graphics command or data supplied from the CPU.

The storage unit 14 is a storage element, such as a read-only memory (ROM) and a random access memory (RAM), a hard disk drive, or the like. A program and the like executed by the processor 12 are stored in the storage unit 14. In addition, the storage unit 14 according to the present embodiment reserves an area of the frame buffer in which the GPU draws an image.

The operation unit 16 is a user interface, such as a keyboard, a mouse, and a controller of a game console, and the operation unit 16 receives operation input of a user and outputs, to the processor 12, a signal indicating the details of the operation input.

The display unit 18 is a display device, such as a liquid crystal display, and the display unit 18 displays various images according to instructions of the processor 12.

The communication unit 20 is a communication interface, such as a network board.

Note that the image generation apparatus 10 may also include an optical disk drive that reads an optical disk, such as a digital versatile disc (DVD)-ROM and a Blu-ray (registered trademark) disk, a universal serial bus (USB) port, and the like.

Figure 2:
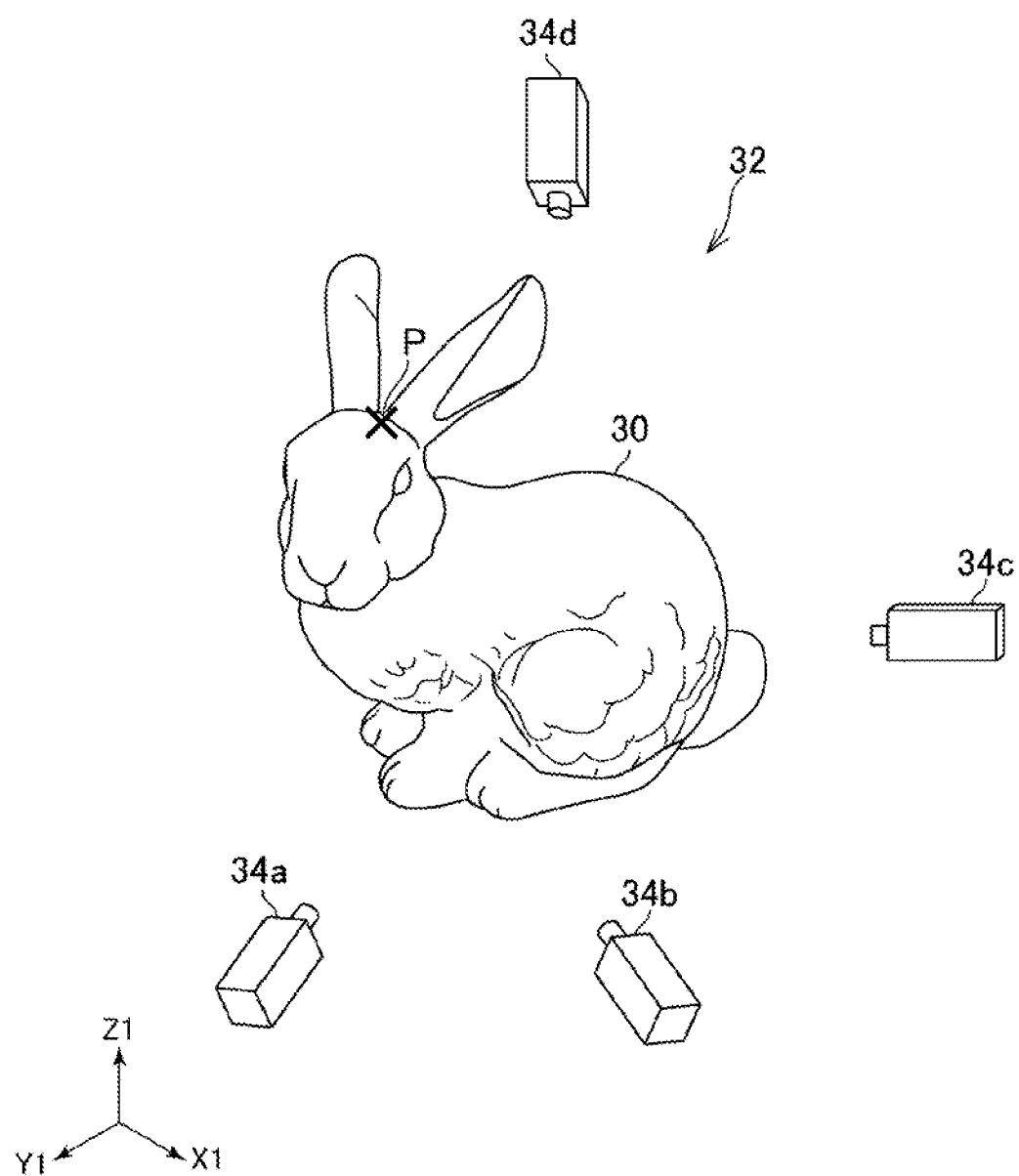
FIG. 2 is a diagram schematically illustrating an example of a situation of a subject arranged in a real space.

FIG. 2 is a diagram schematically illustrating an example of a situation of a subject 30 arranged in a real space 32 according to the present embodiment. A real object shaped like a Stanford bunny is illustrated as an example of the subject 30 in FIG. 2.

Furthermore, in the present embodiment, real cameras 34 arranged in the real space 32 image the subject 30 illustrated in FIG. 2 to generate captured images 36, for example. As illustrated in FIG. 2, in the present embodiment, each of a plurality of real cameras 34 including four real cameras 34a, 34b, 34c, and 34d generates the captured image 36, for example. Note that the number of real cameras 34 that generate the captured images 36 is not limited to four, and each of a larger or smaller number of real cameras 34 may generate the captured image 36. In addition, one real camera 34 may generate the captured images 36 by imaging the subject 30 at a plurality of positions different from each other.

Figure 3A:
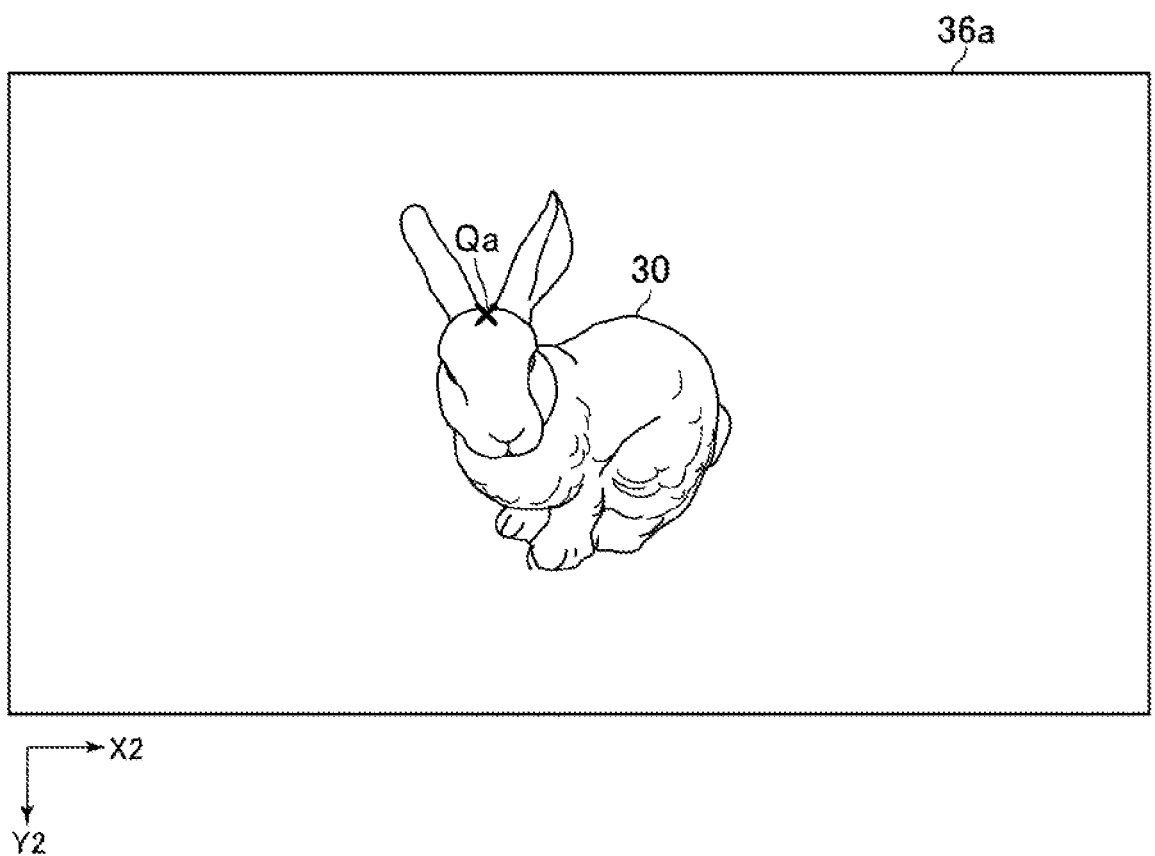
FIG. 3A is a diagram illustrating an example of a captured image.
Figure 3B:
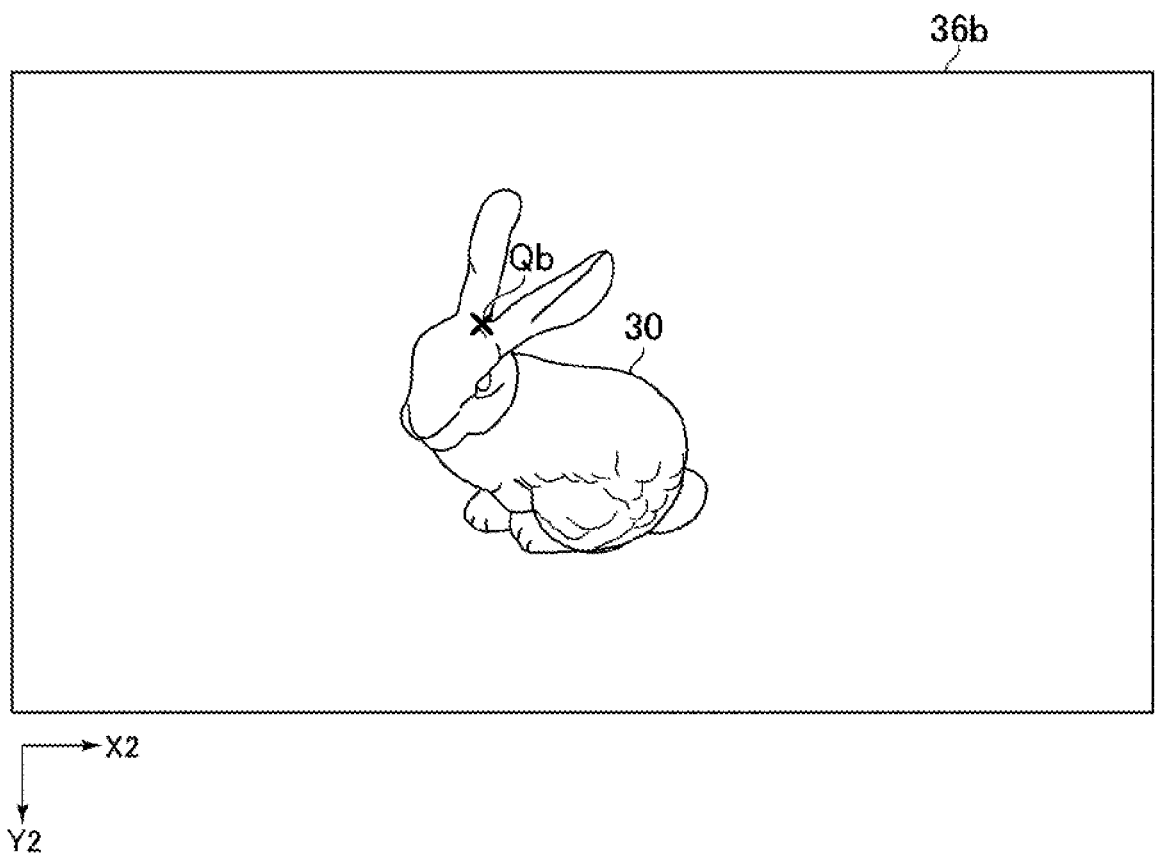
FIG. 3B is a diagram illustrating an example of a captured image.
Figure 3C:
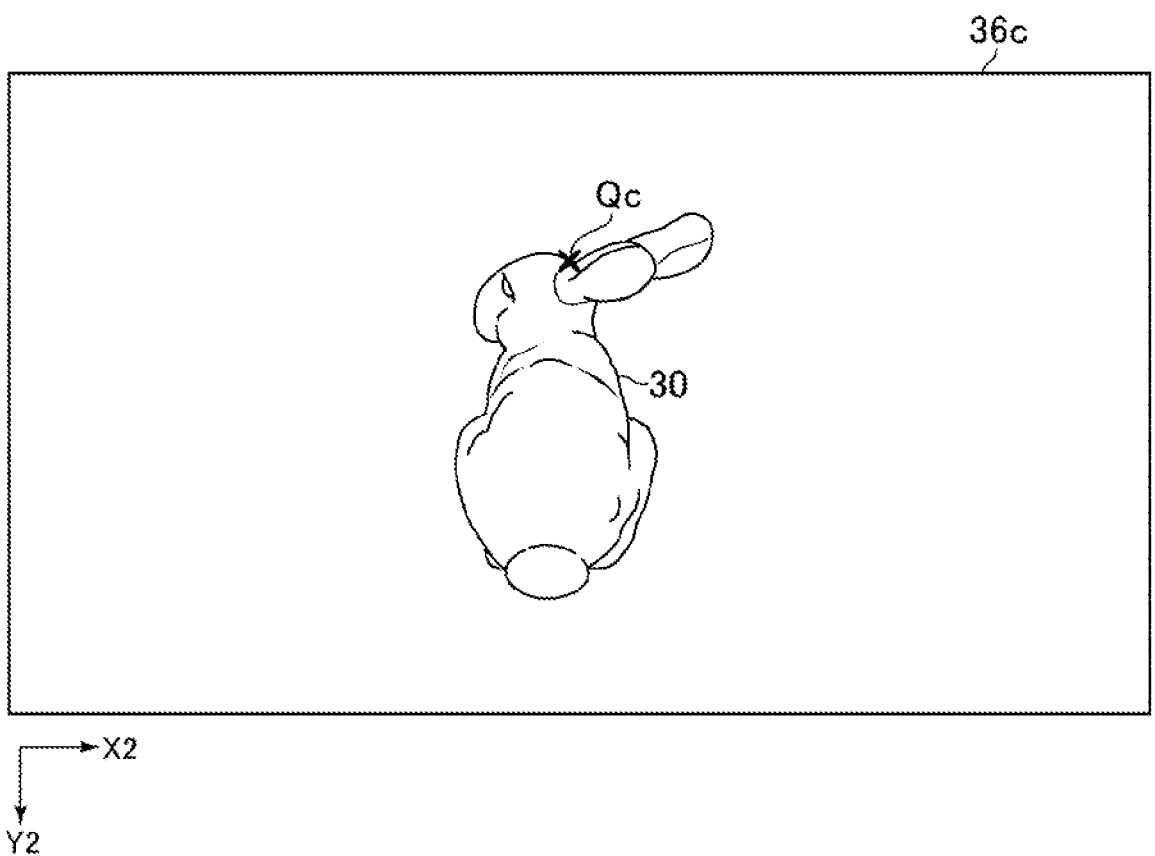
FIG. 3C is a diagram illustrating an example of a captured image.
Figure 3D:
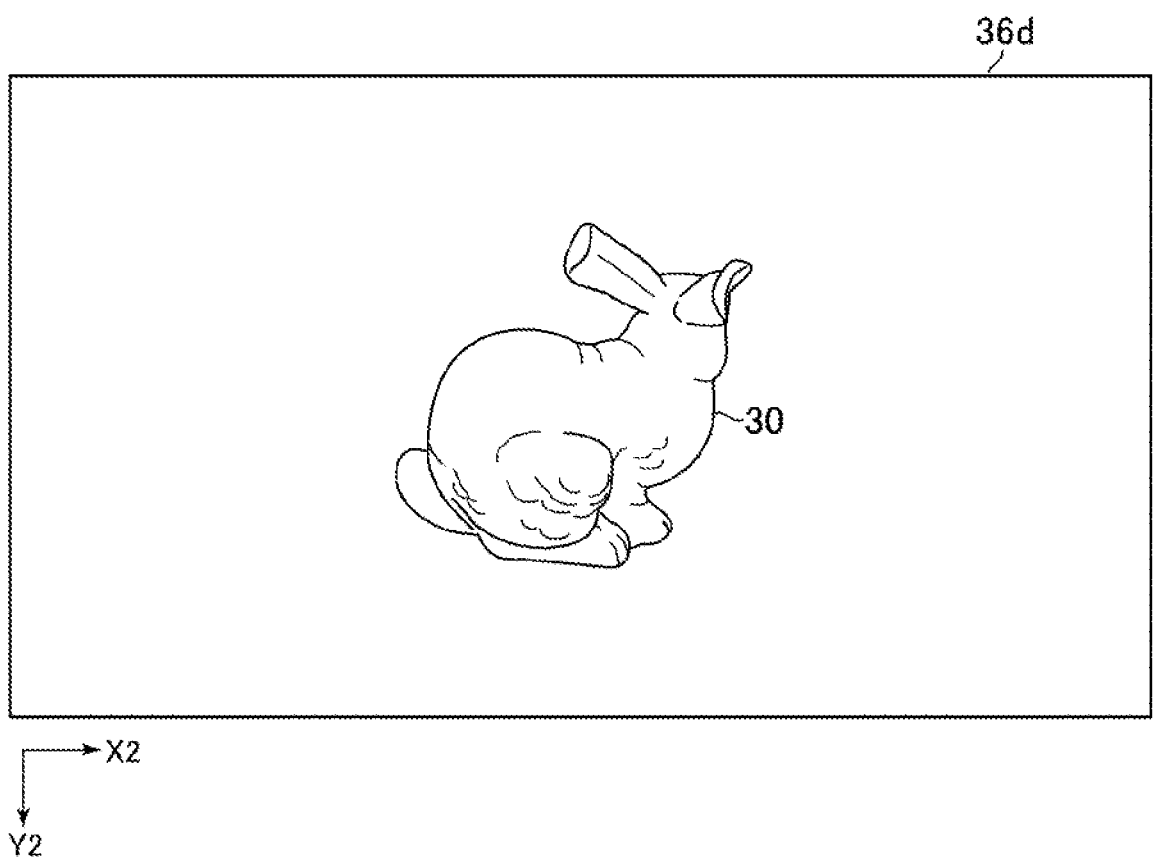
FIG. 3D is a diagram illustrating an example of a captured image.

Each of FIGS. 3A to 3D is a diagram illustrating an example of the captured image 36. FIG. 3A is a diagram illustrating an example of a captured image 36a generated by the real camera 34a. FIG. 3B is a diagram illustrating an example of a captured image 36b generated by the real camera 34b. FIG. 3O is a diagram illustrating an example of a captured image 36c generated by the real camera 34c. FIG. 3D is a diagram illustrating an example of a captured image 36d generated by the real camera 34d.

In the present embodiment, for example, the subject 30 arranged in a three-dimensional space expressed by an X1Y1Z1 coordinate system is projected to a two-dimensional plane expressed by an X2Y2 coordinate system, and the image is arranged on the captured image 36. In this case, some of the captured images 36 include an image of a point P on the surface of the subject 30. Here, for example, it is assumed that the image of the point P is arranged as a pixel Qa in the captured image 36a, a pixel Qb in the captured image 36b, and a pixel Qc in the captured image 36c.

Figure 4:
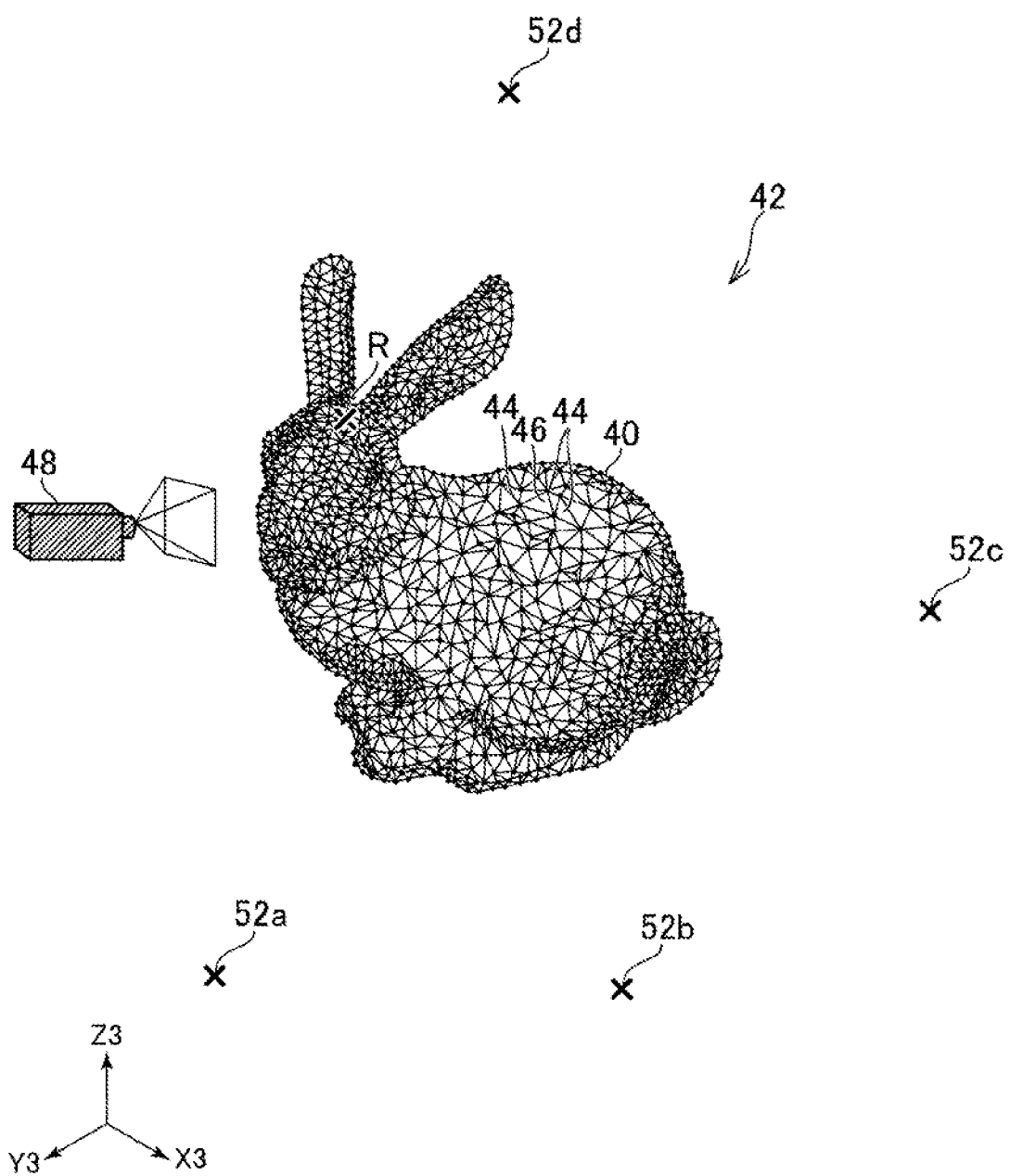
FIG. 4 is a diagram schematically illustrating an example of a situation of a polygon model of the subject arranged in a virtual space.

Furthermore, in the present embodiment, a polygon model 40 illustrated in FIG. 4 is generated based on the captured images 36 as well as the positions, the captured directions, the angles of view, and the like of the real cameras 34 in capturing the captured images 36, for example.

FIG. 4 is a diagram schematically illustrating an example of a situation of the polygon model 40 of the subject 30 arranged in a virtual space 42. The virtual space 42 according to the present embodiment is a space modeling the real space 32. In the present embodiment, the position and the direction of the subject 30 in the real space 32 are reflected on the position and the direction of the polygon model 40 in the virtual space 42. Hereinafter, the position in the real space 32 will be expressed by the X1Y1Z1 coordinate system, and the position in the virtual space 42 will be expressed by an X3Y3Z3 coordinate system.

The polygon model 40 illustrated in FIG. 4 includes a plurality of polygons 46 each including a plurality of vertices 44. Some of the positions of the vertices 44 or points on the polygons 46 are associated with the positions of points on the surface of the subject 30. Furthermore, in the present embodiment, coordinate values (x, y, z) in the X1Y1Z1 coordinate system of the real space 32 are mapped on coordinate values (t*x, t*y, t*z) (t is a constant) in the X3Y3Z3 coordinate system in the virtual space 42, for example. Therefore, in the present embodiment, the three-dimensional shape represented by the polygon model 40 illustrated in FIG. 4 is approximately the same as the shape of the subject 30 illustrated in FIG. 2. In the following description, the value of t is 1. That is, the coordinate values (x, y, z) in the X1Y1Z1 coordinate system of the real space 32 are mapped on the coordinate values (x, y, z) in the X3Y3Z3 coordinate system in the virtual space 42. Here, for example, the point P on the surface of the subject 30 is mapped on a point R that is the vertex 44 or a point on the polygon 46.

Here, for example, a well-known method may be used to specify the positions of the vertices 44 based on the captured images 36. The polygon model 40 including the plurality of polygons 46 may then be generated based on the plurality of specified vertices 44.

Figure 5:
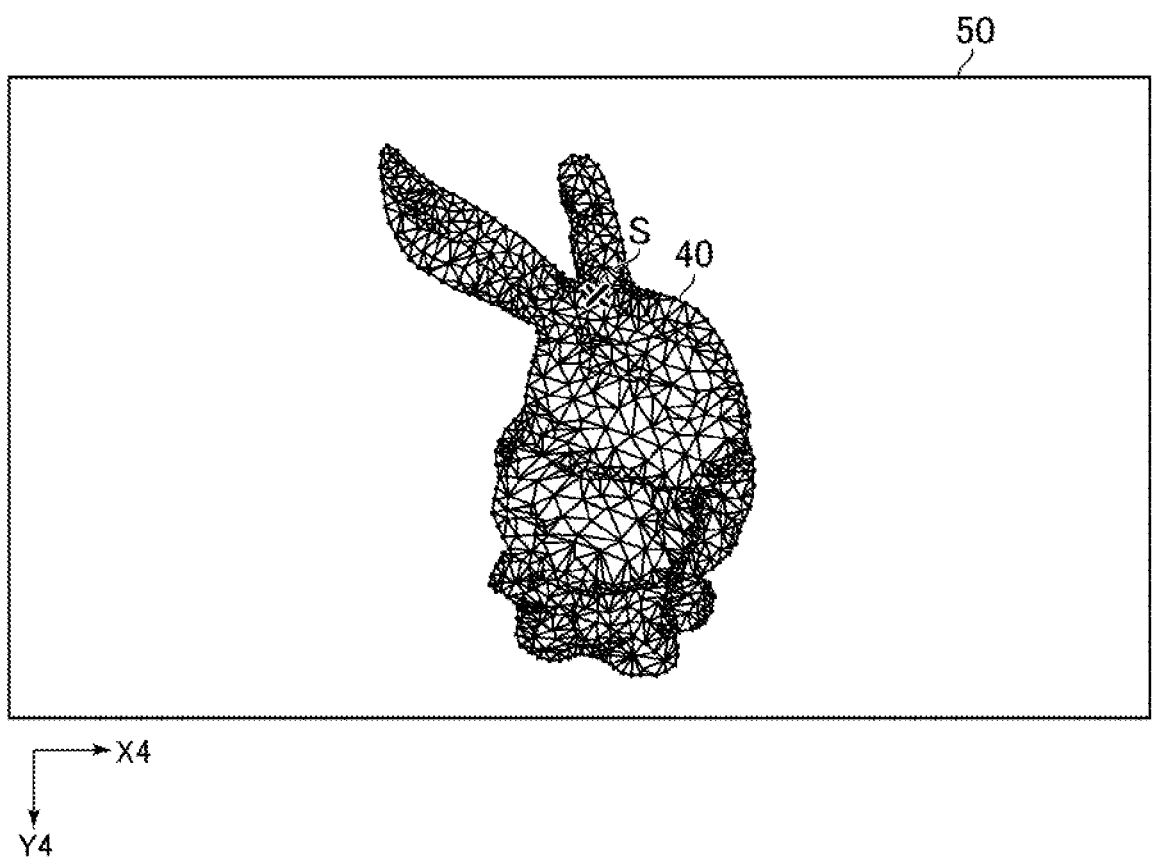
FIG. 5 is a diagram illustrating an example of a virtual space image.

Furthermore, in the present, embodiment, a virtual space image 50 illustrated in FIG. 5 is generated, and the virtual space image 50 represents a situation of the polygon model 40 as viewed from a virtual camera 46 arranged in the virtual space 42. The virtual space image 50 is then displayed on the display unit 18. Here, for example, an image of the point R in the polygon model 40 is arranged as a pixel S in the virtual space image 50.

Here, in the present embodiment, the pixel value of the pixel S in the virtual space image 50 is set based on the pixel values of the pixel Qa, the pixel Qb, and the pixel Qc in the captured images 36. Here, the pixel value is, for example, a value representing the color or the brightness of the pixel, and the expression is not particularly limited. Furthermore, in the present embodiment, the pixel value of each pixel in the virtual space image 50 is set as follows to generate the virtual space image 50 reflecting the natural light environment of the real space 32 in actually capturing the captured images 36.

Hereinafter, the functions of the image generation apparatus 10 and the processes executed by the image generation apparatus 10 according to the present embodiment will be further described.

Figure 6:
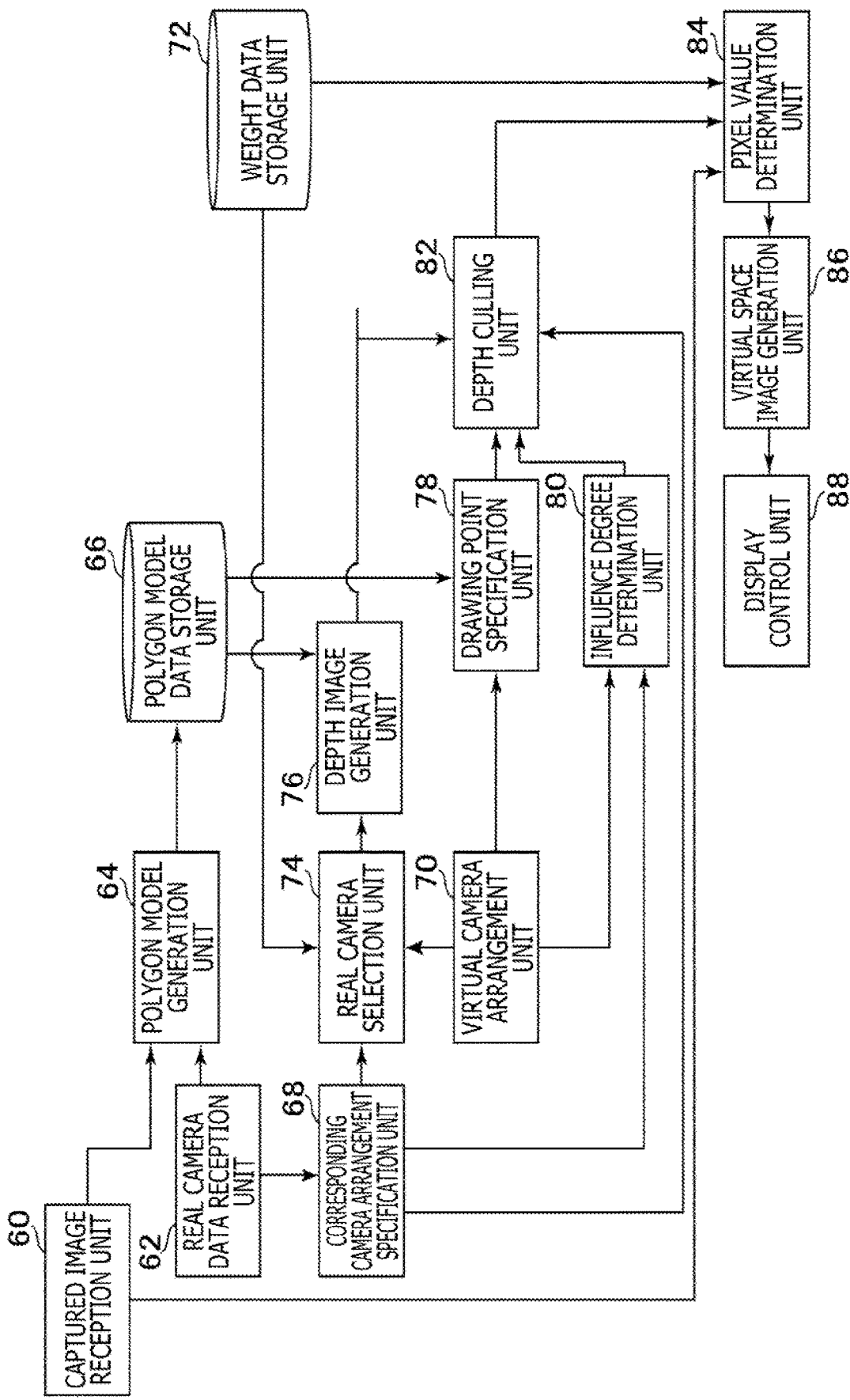
FIG. 6 is a functional block diagram illustrating an example of functions implemented in the image generation apparatus according to an embodiment of the present invention.

FIG. 6 is a functional block diagram illustrating an example of the functions implemented in the image generation apparatus 10 according to the present embodiment. As illustrated in FIG. 6, the image generation apparatus 10 functionally includes, for example, a captured image reception unit 60, a real camera data reception unit 62, a polygon model generation unit 64, a polygon model data storage unit 66, a corresponding camera arrangement specification unit 68, a virtual camera arrangement unit 70, a weight data storage unit 72, a real camera selection unit 74, a depth image generation unit 76, a drawing point specification unit 78, an influence degree determination unit 80, a depth culling unit 82, a pixel value, determination unit 84, a virtual space image generation unit 86, and a display control unit 88.

The master of the captured image reception unit 60 and the real camera data reception unit 62 is the communication unit 20. The master of the polygon model generation unit 64, the corresponding camera arrangement specification unit 68, the real camera selection unit 74, the depth image, generation unit 76, the drawing point specification unit 78, the influence degree determination unit 80, the depth culling unit 82, and the pixel value determination unit 84 is the processor 12. The master of the polygon model data storage unit 66 and the weight data storage unit 72 is the storage unit 14. The masters of the virtual camera arrangement unit 70 are the processor 12 and the operation unit 16. The masters of the virtual space image generation unit 86 are the processor 12 and the storage unit 14. The masters of the display control unit 88 are the processor 12, the storage unit 14, and the display unit 18.

The processor 12 may implement the functions by executing a program installed on the image generation apparatus 10 that is a computer, the program including commands corresponding to the functions. The program may be supplied to the image generation apparatus 10 through, for example, a computer-readable information storage medium, such as an optical disk, a magnetic disk, a magnetic tape, a magneto-optical disk, and a flash memory, or through the Internet or the like.

The captured image reception unit 60 in the present embodiment receives, for example, the captured images 36 from the real cameras 34.

In the present embodiment, for example, the real camera data reception unit 62 receives, from the real cameras 34, real camera data indicating the arrangement of the real cameras 34 in the real space 32, such as the positions, the directions, and the angles of view in the real space 32 of the real cameras 34 that have captured the captured images 36.

The polygon model generation unit 64 in the present embodiment generates, for example, the polygon model 40 illustrated in FIG. 4. Here, the polygon model generation unit 64 may generate polygon model data indicating the polygon model 40 based on the captured images 36 received by the captured image reception unit 60. In addition, the polygon model generation unit 64 may generate the polygon model data based on the captured images 36 received by the captured image reception unit 60 and the real camera data received by the real camera data reception unit 62. Furthermore, the polygon model generation unit 64 in the present embodiment, stores the generated polygon model data in, for example, the polygon model data storage unit 66. Note that the method of generating the polygon model 40 is not particularly limited in the present embodiment.

The polygon model data storage unit 66 stores the polygon model data generated by the polygon model generation unit 64. The polygon model data includes point data illustrated in FIG. 7A, polygon data illustrated in FIG. 7B, and the like.

Figures 7A, 7B, 8:
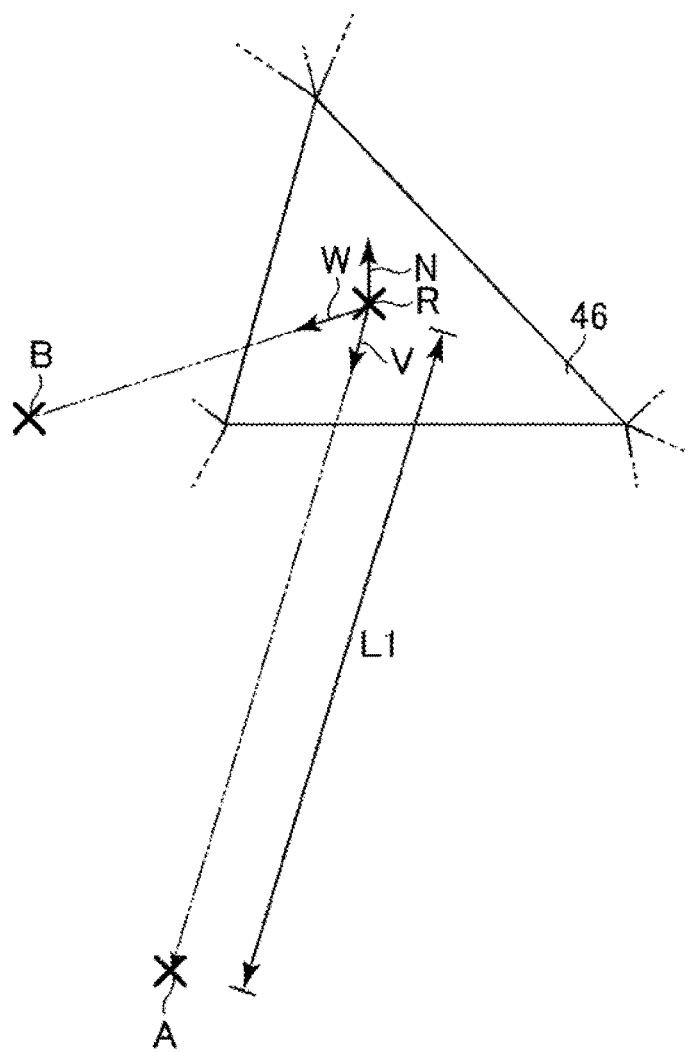
FIG. 7A is a diagram illustrating an example of point data.
FIG. 7B is a diagram illustrating an example of polygon data.
FIG. 8 is a diagram illustrating an example of a relationship between a polygon, a corresponding camera position, and a position of a virtual camera.

FIG. 7A is a diagram illustrating an example of point data associated with a point that is a vertex 44. The point data illustrated in FIG. 7A includes a combination of a point identification (ID) as identification information of the point that is the vertex 44 associated with the point data, coordinate data indicating three-dimensional coordinate values of the position of the point expressed by the X3Y3Z3 coordinate system, and normal direction data indicating the normal direction associated with the point. Here, the normal direction data indicates, for example, three-dimensional coordinate values of a unit vector representing the normal direction expressed by the X3Y3Z3 coordinate system. In addition, the values indicating the normal direction at the point on the polygon 46 are determined in the present embodiment by, for example, interpolating the values of the normal direction data included in the point data associated with the point that is the vertex 44 of the polygon 46. Furthermore, the values of the normal direction data included in the point data associated with the point that is the vertex 44 are determined as values indicating the normal direction at the vertex.

FIG. 7B is a diagram illustrating an example of polygon data associated with a polygon 46. The polygon data includes, for example, a polygon ID that is identification information of the polygon 46 associated with the polygon data and vertex data that is an order list of the point IDs of the vertices 44 of the polygon 46. In addition, the polygon data may define the normal direction (front or back) of the polygon 46 associated with the polygon data. For example, the polygon data may include vertex data that is an order list of the points associated with the vertices 44, the order list indicating the counterclockwise order of the vertices 44 as viewed from the front side of the polygon 46. Furthermore, the direction from the back side to the front side of the polygon 46 may be defined as the normal direction.

The corresponding camera arrangement specification unit 68 in the present embodiment specifies, for example, the arrangement in the virtual space 42 equivalent to the arrangement of the real cameras 34 in the real space 32 indicated by real camera data received by the real camera data reception unit 62 based on the real camera data.

Hereinafter, the arrangement, such as the positions, the directions, and the angles of view, in the virtual space 42 equivalent to the arrangement of the real cameras 34 that have captured the captured images 36 will be referred to as corresponding camera arrangement of the captured images 36. Particularly, the positions in the virtual space 42 equivalent to the positions of the real cameras 34 that have captured the captured images 36 will be referred to as corresponding camera positions 52 of the captured images 36. FIG. 4 illustrates a corresponding camera position 52a of the captured image 36a, a corresponding camera position 52b of the captured image 36b, a corresponding camera position 52c of the captured image 36c, and a corresponding camera position 52d of the captured image 36d. For example, the corresponding camera positions 52 of the captured image 36 may be specified in this way for each of the plurality of captured images 36.

In addition, the positions in the real space 32 of the real cameras 34 that have captured the captured images 36 will be referred to as captured positions.

The virtual camera arrangement unit 70 in the present embodiment determines, for example, the arrangement of the virtual camera 48, such as the position, the direction, and the angle of view of the virtual camera 48, in the virtual space 42. Here, for example, the virtual camera arrangement unit 70 may change the arrangement of the virtual camera 48 according to the operation of the operation unit 16 by the user. In addition, the virtual camera arrangement unit 70 may determine the arrangement of the virtual camera 48 according to the determination operation of the user. Here, for example, the angle of view of the virtual camera 48 may be set in advance, and the virtual camera arrangement unit 70 may determine the position and the captured direction of the virtual camera 48. Furthermore, the angle of view of the virtual camera 48 may be variable, and the virtual camera arrangement unit 70 may determine the position, the captured direction, and the angle of view of the virtual camera 48.

The weight data storage unit 72 in the present embodiment stores, for example, weight data indicating weights of the real cameras 34 or the captured images 36. Here, the values of the weights indicated by the weight data may be, for example, values that can be set by the user and that represent relative weights associated with the plurality of real cameras 34, respectively. Here, for example, the values of the weights may be set such that the shorter the distance between the real camera 34 and the subject 30, the larger the value of the weight of the real camera 34. In addition, for example, the values of the weights may be set such that the higher the resolution of the captured image 36 captured by the real camera 34, the larger the value of the weight of the real camera 34.

Note that for the values of the weights, values according to measured values may be set instead of the values set by the user. For example, in a case where the real camera 34 is a depth camera, the real camera 34 may generate data indicating the distance to the subject 30. The data may then be included in the real camera data. The value of the weight of the real camera may then be determined based on the distance.

The real camera selection unit 74 in the preset embodiment selects, for example, the real camera 34 as a standard for determining the pixel value of each pixel included in the virtual space image 50. Here, for example, the real camera 34 may be selected based on the arrangement of the virtual camera 48 determined by the virtual camera arrangement unit 70 and the corresponding camera arrangement associated with each of the plurality of real cameras 34 specified by the corresponding camera arrangement specification unit 68. In addition, the real camera 34 may be selected based on the weight data.

For example, the evaluation value may foe determined based on the closeness between the corresponding camera arrangement associated with the real camera 34 and the arrangement of the virtual camera 48 and based on the value of the weight of the real camera 34. Here, for example, the evaluation value may be set such that the closer the corresponding camera position 52 and the position of the virtual camera 48, the larger the evaluation value. In addition, the evaluation value may be set such that the closer the direction in the virtual space 42 indicated by the corresponding camera arrangement and the direction of the virtual camera 48, the larger the evaluation value. Furthermore, the evaluation value may be set such that the larger the value of the weight, the larger the evaluation value. A predetermined number of real cameras 34 may then be selected in descending order of evaluation value. Hereinafter, the real cameras 34 selected by the real camera selection unit 74 will be referred to as selected real cameras.

The depth image generation unit 76 in the present embodiment generates, for example, a depth image associated with the captured image 36 captured by the real camera 34 based on the corresponding camera arrangement associated with the polygon model 40 and the real camera 34. Here, the depth image generation unit 76 may generate the depth image associated with the captured image 36 captured by the selected real camera according to the selection of the selected real camera selected by the real camera selection unit 74. Here, the depth image is, for example, an image indicating the distribution of distance from the real camera 34 to the subject 30 associated with the pixels included in the captured image 36. The distance between the point on the surface of the subject 30 associated with the pixel included in the captured image 36 and the real camera 34 that has captured the captured image 36 can be specified based on the depth image.

The drawing point specification unit 78 in the present embodiment specifies, for example, a drawing point that is the vertex 44 or a point on the polygon 46 in the polygon model 40 associated with the pixel in the virtual space image 50. For example, the function of GPU cars be used to specify the drawing point based on the arrangement of the virtual camera 48 in the virtual space 42 and the polygon model 40.

The influence degree determination unit 80 in the present embodiment determines, for example, a degree of influence on the virtual space image 50 influenced by the captured image 36 captured by the real camera 34 at the captured position equivalent to the corresponding camera position 52 based on the position of the virtual camera 48 and the corresponding camera position 52. For example, the degree of influence at the drawing point may be determined based on the direction from the drawing point to the corresponding camera position 52 and the direction from the drawing point to the position of the virtual camera 48.

In addition, for example, the degree of influence at the drawing point may be determined based on the direction from the drawing point to the corresponding camera position 52, the direction from the drawing point to the position of the virtual camera 48, and the normal direction associated with the drawing point. For example, a value of an influence degree parameter in the virtual camera direction indicating a first degree of influence at the drawing point may be calculated based on the direction from the drawing point to the corresponding camera position 52 and the direction from, the drawing point to the position of the virtual camera 48. In addition, for example, a value of an influence degree parameter in the normal direction indicating a second degree of influence at the drawing point may be calculated based on the direction from the drawing point to the corresponding camera position 52 and the normal direction associated with the drawing point.

Here, for example, an example of calculating the values of the influence degree parameters associated with the captured image 36a in the case where the point R illustrated in FIG. 4 is the drawing point will be described with reference to FIG. 8. In FIG. 8, A represents the corresponding camera position 52a, and B represents the position of the virtual camera 48.

In this case, for example, the value of the influence degree parameter in the virtual camera direction associated with the captured image 36a may be set such that the closer the position A and the position B, the larger the value. For example, the value of the influence degree parameter in the virtual camera direction may be set such that the smaller the angle formed by a unit vector V from the position of the point R to the position A and a unit vector W from the position of the point R to the position B, the larger the value. In addition, for example, a value that, is the value of the inner product of the vector V and the vector W to the power of n1 (for example, value to the power of 32) may be the value of the influence degree parameter in the virtual camera direction associated with the captured image 36a. In this case, the value of the influence degree parameter in the virtual camera direction associated with the captured image 36a may be 0 in a case where the value of the inner product of the vector V and the vector W is equal to or smaller than 0.

In addition, the value of the influence degree parameter in the normal direction may be set such that the smaller the angle formed by a vector N in the normal direction associated with the point R and the vector V, the larger the value. For example, a value that is the value of the inner product of the vector v and the vector N to the power of n2 (for example, value to the power of 4) may be the value of the influence degree parameter in the normal direction associated with the captured image 36a. In this case, the value of the influence degree parameter in the normal direction associated with the captured image 36a may be 0 in a case where the value of the inner product of the vector V and the vector N is equal to or smaller than 0. Note that the value n1 may be larger than the value n2 as described above.

The depth culling unit 82 in the present embodiment changes, for example, the value of the influence degree parameter, which is associated with the captured image 36 determined to not influence the pixel value of the pixel in the virtual space image 50 associated with the drawing point, to 0. Hereinafter, the captured image 36 determined to not influence the pixel value of the pixel in the virtual space image 50 associated with the drawing point will be referred to as a non-influencing captured image.

In this case, for example, the depth culling unit 82 multiplies the three-dimensional coordinate values of the drawing point expressed by the X3Y3Z3 coordinate system by a projection matrix according to the corresponding camera arrangement to calculate three-dimensional coordinate values of a projection coordinate system associated with the corresponding camera arrangement.

Here, an X coordinate value in the projection coordinate system associated with the corresponding camera arrangement of the captured image 36a is equivalent to an X2 coordinate value in the captured image 36a. For example, the X coordinate value of the point R illustrated in FIG. 8 in the projection coordinate system associated with the corresponding camera arrangement of the captured image 36a is the same as the X coordinate value of the pixel Qa. In addition, a Y coordinate value in the projection coordinate system associated with the corresponding camera arrangement of the captured image 36a is equivalent to a Y2 coordinate value in the captured image 36a. For example, the Y coordinate value of the point R illustrated in FIG. 8 in the projection coordinate system associated with the corresponding camera arrangement of the captured image 36a is the same as the Y coordinate value of the pixel Qa. Therefore, the position of the pixel in the captured image 36a and the position of the pixel in the depth image equivalent to the combination of the X coordinate value and the X coordinate value in the projection coordinate system can be specified based on the coordinate values.

In addition, a Z coordinate value of the point R illustrated in FIG. 8 in the projection coordinate system associated with the corresponding camera arrangement of the captured image 36a is equivalent to a length L1 between the point R and the position A illustrated in FIG. 8.

The depth culling unit 82 then determines that the captured image 36a is a non-influencing captured image at the drawing point in a case where the difference between a length L2, which is associated with the pixel value of the pixel in the depth image associated with the drawing point, and the length L1 is longer than a predetermined length. The depth culling unit 82 then changes the value of the influence degree parameter, which is associated with the captured image 36a determined to be the non-influencing captured image, to 0.

For example, the pixel Qa is specified as a pixel in the captured image 36a associated with the point R. For example, it is assumed here that X2Y2 coordinate values of the pixel Qa are (x1, y1). In this case, the length L2 is specified that is associated with the pixel value of the depth image associated with the captured image 36a in which the X2Y2 coordinate values are (x1, y1).

Here, in the case where the difference between the length L2 and the length L1 is longer than the predetermined length, it can be stated that the pixel Qa is not the pixel associated with the point R. In this case, for example, an image of the surface of the subject 30, another object, or the like existing at a position closer to the real camera 34a with respect to the point P is likely to be arranged as the pixel Qa in the captured image 36a. Therefore, in this case, the pixel value of the pixel Qa should not be reflected on the pixel value of the pixel S in the virtual space image 50.

In view of this, the captured image 36a is determined to be a non-influencing captured image at the drawing point in the present embodiment in the case where, for example, the difference between the length L2 and the length L1 is longer than the predetermined length as described above. Furthermore, the value of the influence degree parameter in the virtual camera direction and the value of the influence degree parameter in the normal direction associated with the captured image 36a are changed to 0.

Note that in a case where, for example, the real camera 34 is a depth camera, the depth image generated by the real camera 34 may be used to specify the length L2 instead of the depth image generated by the depth image generation unit 76.

The pixel value determination unit 84 in the present embodiment determines, for example, the pixel value of the pixel in the virtual space image 50 associated with the drawing point based on the pixel value of the pixel associated with the drawing point in the captured image 36 and the degree of influence at the drawing point.

Here, a case of determining the pixel value of the pixel S associated with the point R that is the drawing point will be described as an example of determining the pixel value. In addition, it is assumed here that the real camera selection unit 74 selects the real camera 34a, the real camera 34b, and the real camera 34c as selected real cameras.

In addition, the value of the influence degree parameter in the virtual camera direction and the value of the influence degree parameter in the normal direction at the point R associated with the captured image 36a will be defined as a1 and a2, respectively. In addition, the value of the influence degree parameter in the virtual camera direction and the value of the influence degree parameter in the normal direction at the point R associated with the captured image 36b will be defined as b1 and b2, respectively. In addition, the value of the influence degree parameter in the virtual camera direction and the value of the influence degree parameter in the normal direction at the point R associated with the captured image 36c will be defined as c1 and c2, respectively. Furthermore, the values of the weights of the real camera 34a, the real camera 34b, and the real camera 34c will be defined as wa, wb, and wc, respectively.

In this case, the pixel value determination unit 84 first subtracts a value of a1+b1+c1 from 1 to calculate a value t. Here, in a case where the value of a1+b1+c1 is equal to or greater than 1, the value t is 0.

The pixel value determination unit 84 then multiplies the value of the influence degree parameter in the virtual camera direction and the value of the influence degree parameter in the normal camera direction by the value t, adds the values, and multiplies the sum by the value of the weight to calculate a final influence degree value. Here, for example, a value of (a1+t·a2)·wa is calculated as a final influence degree value ax at the point R associated with the captured image 36a. In addition, a value of (b1+t·b2)·wb is calculated as a final influence degree value bx at the point R associated with the captured image 36b. In addition, a value of (c1+t·c2)·wc is calculated as a final influence degree value cx at the point R associated with the captured image 36c.

Here, a pixel value of the pixel Qa in the captured image 36a associated with the point R will be defined as pqa, a pixel value of the pixel Qb in the captured image 36b will be defined as pqb, and a pixel value of the pixel Qc in the captured image 36c will be defined as pqc. In this case, the product of the value pqa and the value ax, the product of the value pqb and the value fcx, and the product of the value pqc and the value cx are added, and the sum total is divided by the sum of the value ax, the value bx, and the value cx. The value is determined as a pixel value ps of the pixel S. That is, the value calculated by a formula ((pqa·ax+pqb·bx+pqc·cx)/(ax+bx+cx)) is determined as the pixel value ps of the pixel S. In this way, the weighted average value of the pixel values of the pixels associated with the drawing point in the plurality of captured images 36 may be calculated based on the degrees of influence associated with the captured images 36. The calculated weighted average value may then be determined as the pixel value of the pixel in the virtual space image 50 associated with the drawing point.

The virtual space image generation unit 86 in the present embodiment generates, for example, the virtual space image 50 based on the captured images 36 and the degree of influence on the virtual space image 50 influenced by the captured image 36. Here, for example, the virtual space image 50 may be generated based on the pixel values of the plurality of pixels in the virtual space image 50 determined by the pixel value determination unit 84.

The display control unit 88 in the present embodiment displays, for example, the virtual space image 50 generated by the virtual space image generation unit 86 on the display unit 16.

It can be considered that the color and the brightness of the surface of the captured image 36 captured from the front of the surface of the subject 30 corresponding to the drawing point is more accurately expressed than in the captured image 36 captured at an angle. Therefore, in the present embodiment, the influence degree parameter in the normal direction causes the pixel value of the pixel of the captured image 36 captured in the captured direction along the normal direction of the drawing point to significantly influence the pixel value of the pixel in the virtual space image 50 associated with the drawing point.

However, even in a case where the corresponding camera position 52 equivalent to the captured position in capturing the captured image 36 and the position of the virtual camera 48 are the same or close, this is not reflected on the degree of influence on the virtual space image 50 influenced by the captured image 36 when only the influence degree parameter in the normal direction is used. Therefore, for example, even when a natural light environment of the real space 32 is accurately expressed in the captured image 36, the natural light environment is not reflected on the virtual space image 50. Therefore, in the present embodiment, the influence degree parameter in the virtual camera direction causes the pixel value of the captured image 36 captured by the real camera 34 at the captured position equivalent to the corresponding camera position 52 close to the position of the virtual camera 48 to significantly influence the pixel value of the pixel in the virtual space image 50.

In this way, according to the present embodiment, the natural light environment of the real space 32 in actually capturing the captured image 36 can be reflected on the virtual space image 50.

Figure 9:
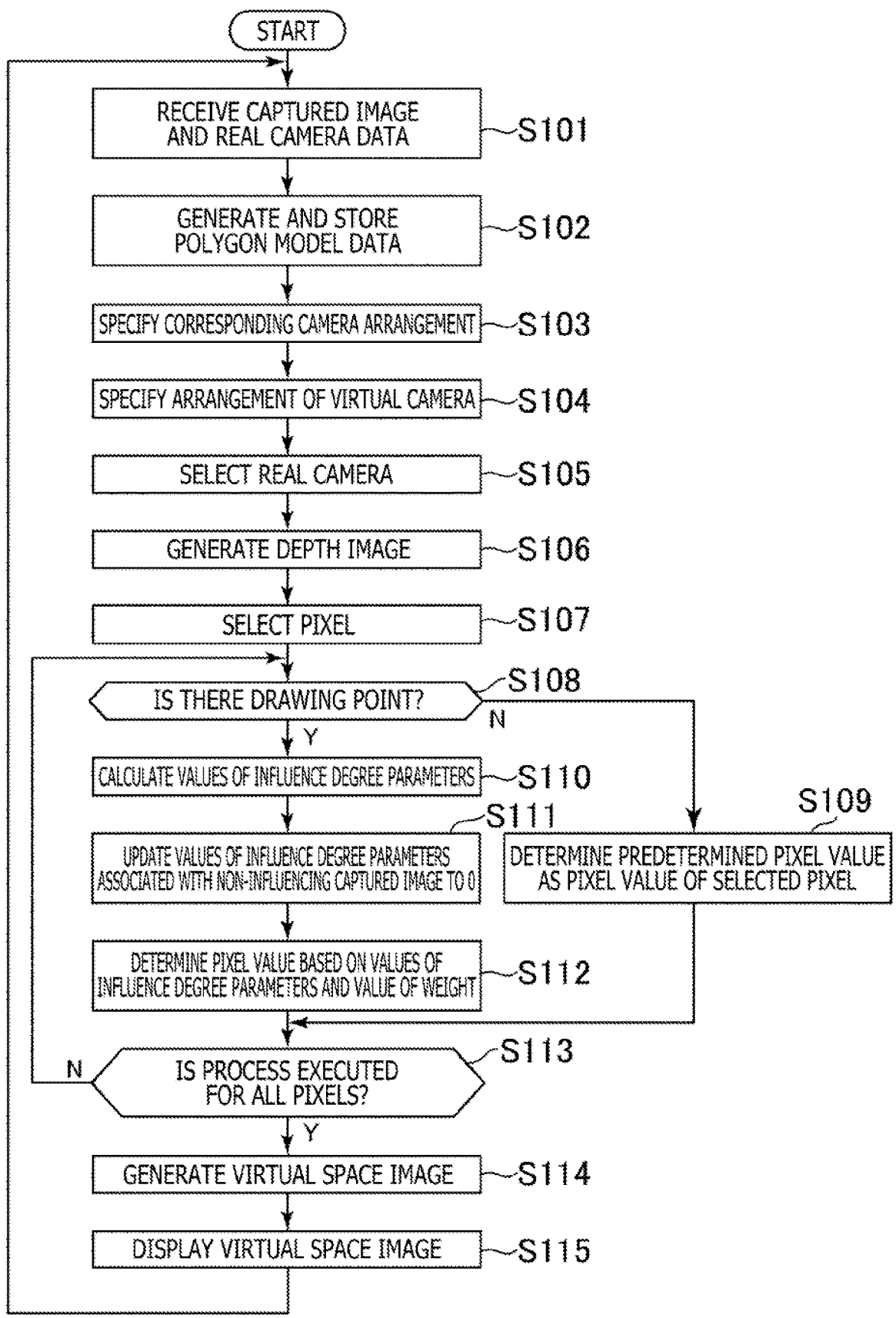
FIG. 9 is a flow chart illustrating an example of a flow of a process executed by the image generation apparatus according to an embodiment of the present invention.

Here, an example of a flow of the generation process of the virtual space image executed by the image generation apparatus 10 according to the present embodiment will be described with reference to a flow chart illustrated in FIG. 9. In the present process example, the loop of the process illustrated in the following S101 to S115 is repeatedly executed. In addition, in the present process example, the imaging timing of the captured images 36 captured by the plurality of real cameras 34 and the transmission timing of the captured images 36 are synchronized.

First, the captured image reception unit 60 receives the captured image 36 from each of the plurality of real cameras 34, and the real camera data reception unit 62 receives the real camera data indicating the arrangement and the like of the real camera 34 in capturing the captured images 36 (S101).

The polygon model generation unit 64 then generates the polygon model data based on the captured images 36 and the camera data received in the process illustrated in S101 and stores the generated polygon model data in the polygon model data storage unit 66 (S102).

The corresponding camera arrangement specification unit 68 then specifies the corresponding camera arrangement associated with each of the plurality of real cameras 34 based on the real camera data received in the process illustrated in S101 (S103). The corresponding camera arrangement specified in the process illustrated in S103 includes the corresponding camera position 52.

The virtual camera arrangement unit 70 then specifies the arrangement of the virtual camera 48 in the loop (S104).

The real camera selection unit 74 then calculates the evaluation value for each of the real cameras 34 and selects some of the plurality of real cameras 34 that have captured the captured images 36 as selected real cameras based on the calculated evaluation values (S105).

The depth image generation unit 76 then generates the depth images associated with the captured images 36 captured by the selected real cameras selected in the process illustrated in S105 (S106).

The drawing point specification unit 78 then selects one of the pixels, for which the process illustrated in the following S108 to S112 is not executed yet, included in the virtual space image 50 representing the situation of the virtual space 42 as viewed from the virtual camera 48 in the arrangement specified in the process illustrated in S104 (S107).

The drawing point specification unit 78 then checks whether there is a drawing point that is the vertex 44 or a point on the polygon 46 associated with the pixel selected in the process illustrated in S107 (S108).

In a case where the existence of the drawing point is not confirmed in the process illustrated in S108 (S108: N), the pixel value determination unit 84 determines a predetermined pixel value as a pixel value of the pixel selected in the process illustrated in S107 (S109). Here, for example, a predetermined pixel value may be determined as a pixel value of the background.

On the other hand, it is assumed that the existence of the drawing point is confirmed in the process illustrated in S108 (S108: Y). In this case, for each of the selected real cameras selected in the process illustrated in S105, the influence degree determination unit 80 calculates the values of the influence degree parameters associated with the captured image 36 captured by the selected real camera (3110). Here, for example, the value of the influence degree parameter in the virtual camera direction and the value of the influence degree parameter in the normal direction are calculated as described above.

The depth culling unit 82 then specifies the non-influencing captured image not influencing the pixel value of the pixel selected in the process illustrated in S107 as described above and updates the values of the influence degree parameters associated with the non-influencing captured image to 0 (S111). In the process illustrated in S111, for example, the non-influencing captured image not influencing the pixel value of the pixel selected in the process illustrated in S107 may be specified based on the depth image generated in the process illustrated in S106.

The pixel value determination unit 84 then determines the pixel value of the pixel selected in the process illustrated in S107 (S112). Here, for example, the pixel value is determined based on the combination of the value of the influence degree parameter in the virtual camera direction and the value of the influence degree parameter in the normal direction associated with the captured image 36 and based on the value of the weight of the selected real camera associated with the captured image 36.

When the process illustrated in S109 or S112 is finished, the drawing point specification unit 78 checks whether or not the process illustrated in S108 to S112 is executed for all pixels included in the virtual space image 50 (S113). In a case where it is confirmed that the process illustrated in S108 to S112 is not executed for all pixels (S113: N), the process returns to S107.

In a case where it is confirmed that the process illustrated in S108 to S112 is executed for all pixels (S113: N), the virtual space image generation unit 86 generates the virtual space image 50 in which the pixel values determined in the process illustrated in S112 are set for all pixels in the virtual space image 50 (S114).

The display control unit 88 then displays the virtual space image 50 generated in the process illustrated in S114 on the display unit 18 (S115).

As described above, the process illustrated in S101 to S115 is repeatedly executed in the present process example.

Here, for example, the plurality of real cameras 34 may repeatedly capture the captured images 36 at a predetermined sampling rate. In addition, a plurality of processes or threads may be used to execute the processes illustrated in S101 to S115 in parallel at shifted execution timing. One of the processes or the threads may then foe used to execute the process illustrated in S101 at the sampling rate. For example, in this way, the delay equivalent to the execution time of the process illustrated in S101 to S115 can be permitted to render in real time the virtual space image 50 representing the situation of the virtual space 42 as viewed from an arbitrary position of the virtual camera 48.

Note that, for example, there is a case in which the arrangement of the real, cameras 34 and the arrangement of the subject 30 are fixed, and the generation of the depth image associated with the captured image 36 captured by the real camera 34 is already finished in the previous loops. For example, in this case, the process illustrated in S106 may not be executed.

In addition, for example, the captured image reception unit 60 may also receive the depth image in the process illustrated in S101 in the case where the real camera 34 is a depth camera that can generate the depth image. Furthermore, in this case, the selected real camera not influencing the pixel value of the pixel selected in the process illustrated in S107 may be specified in the process illustrated in S111 based on the depth image received in the process illustrated in S101.

In addition, the process illustrated in S111 may not be executed in the process illustrated in the process example.

Note that the present invention is not limited to the embodiment.

In addition, the specific character strings and numeric values described above and the specific character strings and the numeric values in the drawings are illustrative, and the character strings and the numeric values are not limited to these.

The invention claimed is:

1. An image generation apparatus that generates a virtual space image representing a situation of a virtual space as viewed from a virtual camera in the virtual space provided with a polygon model based on a plurality of captured images of a subject arranged in a real space from a plurality of real cameras, the image generation apparatus comprising:
   a corresponding camera position specification unit that, for each of the plurality of real cameras, specifies a corresponding camera position that is a position in the virtual space equivalent to a captured position that is a position in the real space of each real camera of the plurality of real cameras;
   an influence degree determination unit that determines a final influence degree value for each real camera of the plurality of real cameras by:
      determining an influence degree parameter in a virtual camera direction;
      determining an influence degree parameter in a normal camera direction;
      multiplying a linear combination of the influence degree parameter in the virtual camera direction and the influence degree parameter in the normal camera direction by a weight associated with the real camera to determine the final influence degree value,
      wherein the final influence degree value is set to zero for each real camera if a point R on the polygon model is not present in the captured image;
   a pixel value determination unit for determining final pixel values S for each point R of the polygon model by calculating a weighted average of pixel values from each of the captured images using the final influence degree for each real camera of the plurality of real cameras; and
   a virtual space image generation unit that generates the virtual space image using the final pixel values S for each point R of the polygon model.

2. An image generation method of generating a virtual space image representing a situation of a virtual space as viewed from a virtual camera in the virtual space provided with a polygon model based on a plurality of captured images of a subject arranged in a real space from a plurality of real cameras, the image generation method comprising:
   specifying, for each of the plurality of real cameras, a corresponding camera position that is a position in the virtual space equivalent to a captured position that is a position in the real space of each real camera of the plurality of real cameras;
   determining a final influence degree value for each real camera of the plurality of real cameras by:
      determining an influence degree parameter in a virtual camera direction;
      determining an influence degree parameter in a normal camera direction; and
      multiplying a linear combination of the influence degree parameter in the virtual camera direction and the influence degree parameter in the normal camera direction by a weight associated with the real camera to determine the final influence degree value,
      wherein the final influence degree value is set to zero for each real camera if a point R on the polygon model is not present in the captured image;
   determining final pixel values S for each point R of the polygon model by calculating a weighted average of pixel values from each of the captured images using the final influence degree for each real camera of the plurality of real cameras; and
   generating the virtual space image using the final pixel values S for each point R of the polygon model.

3. A non-transitory computer readable storage medium having stored thereon a program for generating a virtual space image representing a situation of a virtual space as viewed from a virtual camera in the virtual space provided with a polygon model based on a plurality of captured images of a subject arranged in a real space from a plurality of real cameras, the program for a computer comprising:
   by a corresponding camera position specification unit, specifying a corresponding camera position that is a position in the virtual space equivalent to a captured position that is a position in the real space of each real camera of the plurality of real cameras;
   by an influence degree determination unit, determining a final influence degree value for each real camera of the plurality of real cameras by:
      determining an influence degree parameter in a virtual camera direction;
      determining an influence degree parameter in a normal camera direction; and
      multiplying a linear combination of the influence degree parameter in the virtual camera direction and the influence degree parameter in the normal camera direction by a weight associated with the real camera to determine the final influence degree value,
      wherein the final influence degree value is set to zero for each real camera if a point R on the polygon model is not present in the captured image;
   by a pixel value determination unit, determining final pixel values S for each point R of the polygon model by calculating a weighted average of pixel values from each of the captured images using the final influence degree for each real camera of the plurality of real cameras; and
   by a virtual space image generation unit, generating the virtual space image using the final pixel values S for each point R of the polygon model.

* * * * *